United States Patent [19]
Wright

[11] 3,877,672
[45] Apr. 15, 1975

[54] FASTENER
[75] Inventor: Thomas B. Wright, Diamond Bar, Calif.
[73] Assignee: TRW Inc., City of Industry, Calif.
[22] Filed: June 21, 1972
[21] Appl. No.: 264,729

[52] U.S. Cl. ................................ 248/503; 151/10
[51] Int. Cl. ............................................ B65d 45/24
[58] Field of Search .......... 151/10, 11 B, 47, 48, 39, 151/40, 41; 248/36 R, 25

[56] References Cited
UNITED STATES PATENTS
| 477,149 | 6/1892 | Parrot | 151/47 |
| 721,990 | 3/1903 | Young | 151/10 |
| 1,193,370 | 8/1916 | Duffy | 151/10 |
| 3,212,746 | 10/1965 | Wright | 248/361 |
| 3,480,248 | 11/1969 | Lucchino et al. | 248/361 |
| 3,734,444 | 5/1973 | Thorngate | 248/361 R |

Primary Examiner—Edward C. Allen
Attorney, Agent, or Firm—Gordon L. Peterson

[57] ABSTRACT

A fastener comprising a screw, a fastener member mounted on the screw for movement longitudinally thereof, a nut mounted on the screw for threaded cooperation therewith, a locking member mounted on the nut for rotation with the nut and for axial movement relative to the nut, a spring for urging the locking member axially of the nut toward the fastener member, and ratchet teeth on the locking member and the fastener member which are engageable to prevent rotation of the nut and the locking member in a direction to move them away from the fastener member.

2 Claims, 4 Drawing Figures

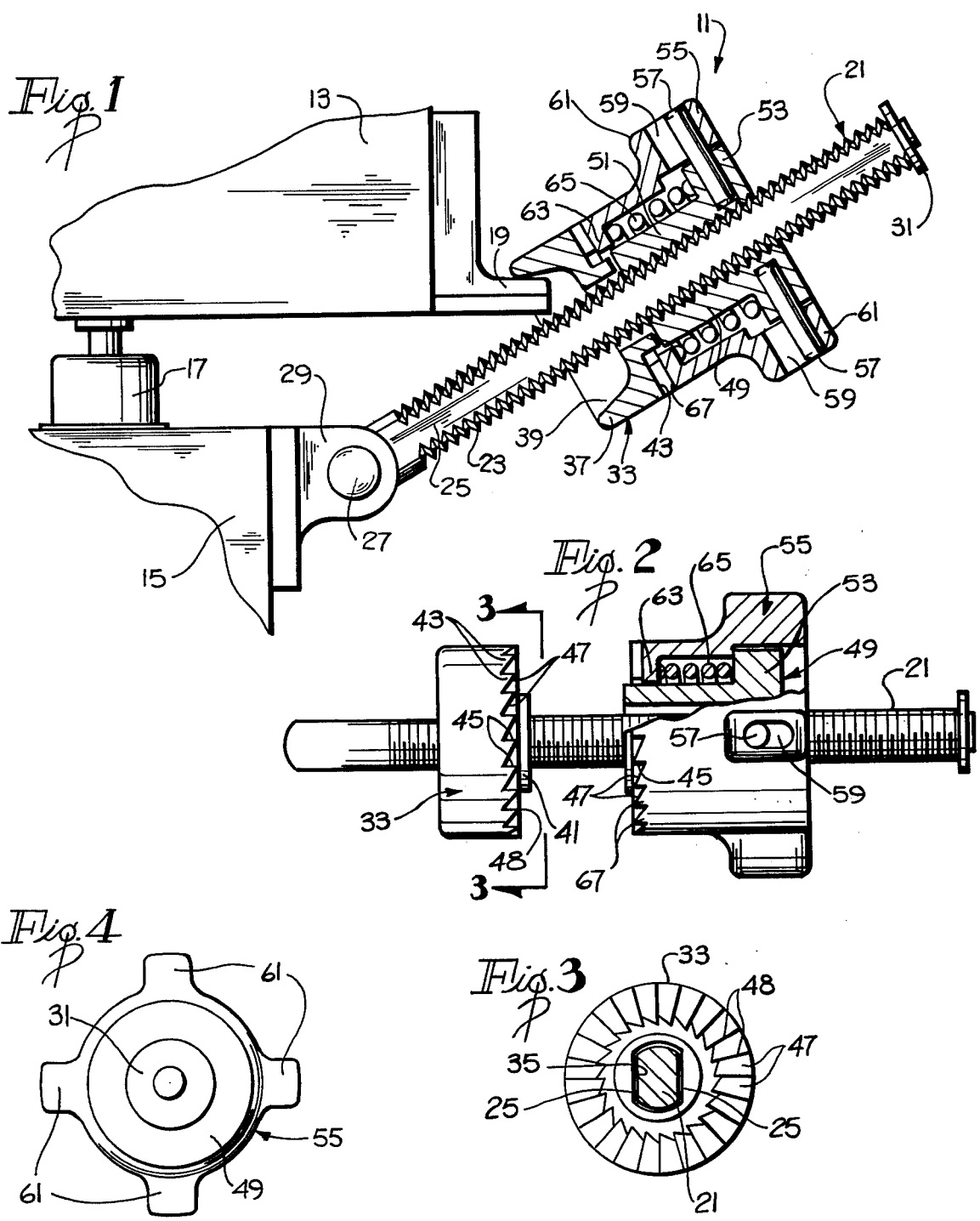

FASTENER

BACKGROUND OF THE INVENTION

It is sometimes necessary to fasten a container to a support while allowing the container to move within predetermined limits relative to the support. For example, a container may be positioned on vibration isolators which are in turn mounted on the support. In this instance, the fastener must firmly retain the container on the vibration isolators while allowing some limited relative movement between the container and the support so that the vibration isolators can perform their intended function. This is sometimes necessary, for example, in aircraft where certain electronic gear used in operation of the aircraft is mounted on vibration isolators.

U.S. Pat. No. 3,212,746 discloses a fastener which is suitable for use in the above-described environment. However, the patented fastener must first be tightened and then locked in a separate locking motion. For this reason, if a workman forgets to carry out the separate locking motion, the fastener may become loose or completely released due to various factors such as vibration.

In addition, the patented fastener does not have a fine locking adjustment. Specifically, the patented fastener employs a nut and a screw and the nut can only be locked every one-half turn. For some applications, it is desirable to provide a locking capability more often than once each half turn.

SUMMARY OF THE INVENTION

The present invention solves the problems noted above and provides certain features and advantages. The concepts of the present invention can be advantageously embodied in a fastener which includes a screw, a fastener member mounted on the screw for movement longitudinally thereof, and a nut mounted on the screw for threaded cooperation therewith. The fastener member is held against rotation relative to the screw.

The present invention provides a locking member on the nut which cooperates in a novel manner with the fastener member to positively and automatically prevent unintended loosening or release of the fastener. The locking member is mounted on the nut for rotation with the nut and for limited, generally axial movement relative to the nut. Biasing means urges the locking member generally axially of the nut toward the fastener member.

In use, the screw is attachable to a first element such as a support and the fastener member can be urged against a second element and cooperates therewith to retain the second element on the first element. To move the fastener member into cooperating engagement with the second element, the nut is rotated in the appropriate direction, and the locking member bears against the fastener member to move the latter axially along the screw into a fastening position.

The present invention provides cooperating means on the locking member and the fastener member which automatically locks the nut and fastener member in the fastening position. The cooperating means, when engaged, prevents the nut from rotating a substantial amount in a direction to back the nut and locking member away from the fastener member. However, the cooperating means allows the locking member to drive the fastener member to a locked position even though the cooperating means are engaged. Accordingly, tightening the fastener and locking the fastener into the tightened position are obtained from the same motion and no separate fastener locking motion is required.

The cooperating means can advantageously take the form of ratchet teeth on the fastener member and the locking member. Each of the ratchet teeth preferably has a locking surface engageable with the locking surface of the mating tooth to prevent counterrotation of the locking member. Each of the ratchet teeth also preferably has an inclined cam surface which is cooperable with the cam surface of the mating tooth to allow forward rotation of the nut and locking member when the teeth are engaged. The ratchet teeth can be of any size; however, the finer the ratchet teeth, the finer the adjustment on tightening.

To release the fastener, the locking member is axially withdrawn against the force of the biasing means to disengage the ratchet teeth. With the teeth disengaged, the nut is counterrotated to retract the nut and locking member from the fastener member.

An important advantage of the present invention is that the ratchet teeth allow the locking member and the nut to be advanced to the fastening position without requiring that the locking member be manually axially withdrawn against the biasing means and simultaneously rotated relative to the nut. With the present invention, the locking member and nut are manually rotated, and the camming surfaces of the ratchet teeth cam the locking member axially against the force of the biasing means.

This fastener can be advantageously employed by providing a recess on the fastener member which is cooperable with a lug of the second element. The screw can advantageously be pivotally mounted on the first element. In this manner, the fastener mounts the second element on the first element and allows for limited relative movement therebetween.

The invention can best be understood by reference to the following description taken in connection with the accompanying illustrative drawing.

BRIEF DESCRIPTION OF THE DRAWING

FIG. 1 is a fragmentary side elevational view of a fastener constructed in accordance with the teachings of this invention being utilized to interconnect two elements. The fastener is shown in longitudinal section.

FIG. 2 is a top plan view of the fastener partially in section with the locking member being in an axially withdrawn position relative to the nut.

FIG. 3 is a sectional view taken along line 3—3 of FIG. 2 with portions of the fastener member 33 being shown in section.

FIG. 4 is an end elevational view of the fastener.

DESCRIPTION OF THE PREFERRED EMBODIMENT

FIG. 1 shows a fastener 11 used to interconnect a container 13 for aircraft electronic gear (not shown) to a support 15. A plurality of vibration isolators 17 (one being shown in FIG. 1) are mounted on the support 15, and the container 13 rests on the vibration isolators. The function of the vibration isolators 17 is to allow the container 13 to move relative to the support 15. The container 13 has a horizontal lug 19 mounted thereon for cooperation with the fastener 11 in a manner described more fully hereinbelow.

The fastener 11 includes a screw 21 having external threads 23 and opposed flats 25 (FIGS. 1 and 3). The screw 21 is pivotally mounted at its inner end by a pin 27 to a bracket 29 carried by the support 15. The pin 27 allows the screw 21 to pivot about a horizontal axis. The outer end of the screw includes a thin plate-like head 31.

A fastener member 33 is mounted on the screw 21 for movement longitudinally of the screw. As best seen in FIG. 3, the fastener member 33 has a central aperture 35 which loosely receives the screw 21. The aperture 35 has a shape which is similar to the cross sectional configuration of the screw 21. The surfaces defining the aperture 35 cooperate with the flats 25 of the screw 21 to prevent relative rotation between the fastener member 33 and the screw 21.

The fastener member 33 has a peripheral flange 37, the inner surface of which is tapered radially outwardly as it projects axially toward the lug 19. The flange 37 defines a recess 39 into which the lug 19 is partially received. The fastener member 33 also has a collar 41 which surrounds the screw 21 in close proximity thereto. The collar 41 prevents the fastener member from wobbling excessively on the screw 21.

The fastener member 33 has ratchet teeth 43 arranged in a ring-like configuration. Each of the ratchet teeth 43 has a locking surface 45 which lies substantially in an axial plane which contains the axis of the fastener member 33 and a cam surface 47. As best seen in FIG. 2, each of the cam surfaces 47 is inclined axially and extends circumferentially between adjacent locking surfaces 45. Adjacent cam surfaces 47 and locking surfaces 45 intersect to form crests 48 which extend generally radially. The ratchet teeth 43 terminate radially outwardly of the circumferential periphery of the fastener member 33.

A nut 49 having a shank 51 and a head 53 is mounted on the screw 21 for threaded cooperation therewith. The nut 49 lies within a tubular locking member 55. As shown in FIGS. 1 and 3, the locking member 55 has a passage therethrough in which the nut 49 is positioned. Thus, the nut 49 is housed in the locking member 55. The locking member 55 is mounted on the nut for rotation therewith and axial movement relative to the nut by a pair of pins 57 affixed to the head 53 of the nut 49 and received in slots 59, respectively, of the locking member. The circumferential dimension of the slots 59 relative to the pin 57 is such as to prevent relative rotation between the nut 49 and the locking member 55. However, the slots 59 have a dimension axially of the screw 21 which is longer than the corresponding dimension of the associated pins 57. Accordingly, the nut 49 and the locking member 55 can be moved axially relative to each other a limited amount. The locking member 55 has a plurality of radial projections 61 (four equal spaced projections being shown by way of example in FIG. 4), and the slots 59 can advantageously be formed in two opposed projections.

The locking member 55 has a circumferentially extending flange 63 which projects radially inwardly at the end of the locking member nearer the fastener member 33. A coil spring 65 acts between the head 53 of the nut 49 and the flange 63 of the locking member 55 to urge the locking member 55 axially of the screw 21 toward the fastener member 33. As shown in FIGS. 1 and 2, the nut 49 and the locking member 55 cooperate to form a housing or enclosure for the spring 65.

The locking member 55 has a plurality of ratchet teeth 67 formed in a ring-like configuration at the end thereof which confronts the fastener member 33. The ratchet teeth 67 are identical to the ratchet teeth 43, and corresponding parts thereof are designated by corresponding reference numerals. The teeth 67 terminate radially outwardly at the circumferential periphery of the locking member 55. The locking surfaces 45 and the cam surfaces 47 are arranged so that when the teeth 43 and 67 are engaged, the nut 49 and the locking member 55 cannot be rotated in a direction to move the nut and locking member away from the fastener member 33. However, the camming surfaces of the teeth 43 and 67 permit the nut 49 and the locking member 55 to be rotated in a direction to move them closer to the fastener member 33.

FIG. 1 shows one use of the fastener 11. As shown in FIG. 1, the screw 21 is pivotally connected to the support 15 by the pin 27. With the fastener member 33 spaced from the lug 19, the locking member 55 and the nut 49 can be rotated on the screw 21 to advance them toward the lug 19. This has the effect of pushing the fastener member 33 axially of the screw 21 toward the position shown in FIG. 1. Ultimately, the lug is received within the recess 39 and further movement of the fastener member 33 is resisted by contact between the lug and the flange 37 of the locking member. The fastener 11 can now be tightened by continuing the rotation of the nut 43 and the locking member 55, such relative rotational movement between the locking member and the fastener member 33 being permitted by the ratchet teeth 43 and 67. Specifically, the cam surfaces 47 of the teeth 43 and 67 cooperate to cam the locking member axially against the force of the spring 65 to thereby permit the teeth 67 to ride over the teeth 43 during tightening of the fastener. Thus, there is no need for the operator to manually axially retract the locking member 55. When the proper amount of tension has been placed on the screw 21, the operator simply discontinues the rotational movement of the nut 49 and the locking member 55. The nut 49 is automatically locked against counter-rotation, i.e., rotation to loosen the fastener 11 by the cooperative engagement of the locking surfaces 45 of the teeth 43 and 67.

To release the fastener 11, the operator pulls the locking member axially of the nut 49 against the biasing force of the spring 65 to the position shown in FIG. 2 to thereby separate the teeth 43 and 67. With the teeth thus separated, the nut 49 and the locking member 55 can be counterrotated to move the nut and locking member away from the fastener member. When the nut 49 has been counterrotated sufficiently to space the teeth 43 and 67 even with the spring 65 expanded as shown in FIG. 1, the nut and locking member 55 can then be rotated freely as a unit without manually compressing the spring 65.

The tension can be accurately set in the screw 21. The fineness of the adjustment is a function of the circumferential length of each of the ratchet teeth 43 and 67. More specifically, it is a function of the circumferential spacing of the locking surfaces 45. In the embodiment illustrated, each of the ratchet teeth extends circumferentially for approximately 15°. Accordingly, the nut may be locked in any one of 24 different positions in each turn of the nut.

Although an exemplary embodiment of the invention has been shown and described, many changes, modifications and substitutions may be made by one having ordinary skill in the art without necessarily departing from the spirit and scope of this invention.

I claim:

1. A fastener comprising:

a screw;

a fastener member mounted on said screw for movement longitudinally thereof, said fastener member having a first collar projecting axially of the screw and defining a cavity opening in the axial direction;

means for substantially preventing relative rotation between the screw and the fastener member;

a nut mounted on said screw for threaded cooperation therewith whereby rotation of the nut in one direction advances the nut along said screw toward the fastener member and rotation of the nut in the opposite direction withdraws the nut away from the fastener member;

a locking member having a passage therethrough and forming a housing for said nut, said nut being in said passage;

a pin mounted on said nut and projecting radially outwardly thereof;

said locking member having a slot extending completely therethrough for receiving said pin, said slot being of larger axial dimension than said pin to thereby allow for relative axial movement between said locking member and said nut;

biasing means radially intermediate portions of the nut and the locking member for urging the locking member generally axially toward said fastener member;

radially extending cooperating teeth on said members, each of said teeth including a cam surface for permitting rotation of said nut and said locking member in said one direction when said cooperating teeth are engaged whereby rotation of said nut and said locking member advances said fastener member along said screw, each of said teeth including a locking surface for preventing substantial rotation of said nut and said locking member in said opposite direction when said cooperating teeth are engaged whereby a positive lock is provided and said nut and said locking member are locked against substantial movement away from the fastener member, said locking member and said nut being rotatable in said opposite direction by first moving the locking member generally axially of the screw against the force of the biasing means to disengage said cooperating teeth;

said fastener member including a second collar projecting axially toward said nut radially inwardly of said teeth to reduce the tendency of the fastener member to wobble on said screw, said first and second collars extending in opposite directions; and said locking member including a radial outward projection having said slot extending therethrough, said locking member including a flange extending radially inwardly, one end of said biasing means bearing against said flange.

2. A fastener as defined in claim 1 wherein said flange on said locking member is spaced from said slot, said nut having a head spaced from said flange on said locking member, said biasing means acting between said flange and said head, said pin being mounted on said head.

* * * * *